(12) United States Patent
Wojcik et al.

(10) Patent No.: US 7,795,559 B2
(45) Date of Patent: Sep. 14, 2010

(54) VACUUM DEBRIS REMOVAL SYSTEM

(75) Inventors: Leszek Wojcik, Poughquag, NY (US);
Diwakar Kedlaya, Yonkers, NY (US);
Kanti Jain, Hawthorne, NY (US);
Sivarama Krishna Kuchibhotla,
Thealls, NY (US); Arun Paneerselvam,
White Plains, NY (US)

(73) Assignee: Anvik Corporation, Hawthorne, NY (US)

( * ) Notice: Subject to any disclaimer, the term of this patent is extended or adjusted under 35 U.S.C. 154(b) by 245 days.

(21) Appl. No.: 11/977,879

(22) Filed: Oct. 26, 2007

(65) Prior Publication Data

US 2009/0107966 A1    Apr. 30, 2009

(51) Int. Cl.
*B23K 26/00* (2006.01)

(52) U.S. Cl. .............................. 219/121.72; 219/121.84

(58) Field of Classification Search .. 219/121.6–121.86
See application file for complete search history.

(56) References Cited

U.S. PATENT DOCUMENTS 3,866,398 A * 2/1975 Vernon et al. ................ 134/1.3
6,048,446 A * 4/2000 Michaelis ................... 205/127
6,242,156 B1 * 6/2001 Teng ........................ 430/270.1
2004/0226927 A1 * 11/2004 Morikazu et al. ...... 219/121.84

* cited by examiner

*Primary Examiner*—Sang Y Paik
(74) *Attorney, Agent, or Firm*—Carl C. King (57) ABSTRACT

A turbulence-controlled vacuum debris removal subsystem safely exhausts particles ejected during photoablation. Nested interconnected chambers provide diminishing sweeping gas partial pressure and diminishing turbulence, ejecting particles from the ablation beam path between pulses, without compromising continuing particle conductance. Removal rate (debris generation rate) depends on conductance and particle sizes. The chambers interconnect through metering holes which enable optimization of partial pressure differentials. Controlled flow accomplishes debris removal, reducing turbulence of the mixture of debris and sweeping gases. A preferred embodiment uses a nest of concentric chambers, providing a clear light path. Another preferred embodiment uses orifices on chamber faces for removal and forming an envelope of gas around the processing region for dynamically containing the ejected particulate matter from the ablation site to the exhaust.

6 Claims, 4 Drawing Sheets

VACUUM DEBRIS REMOVAL SYSTEM

BACKGROUND OF THE INVENTION (1) Field of the Invention

The present invention relates to an inert gas debris removal subsystem to carry off particulate contaminants from the radiation-ablated region of a substrate being treated in a photo-ablation system. and specially relates to such a subsystem with multiple chambers having openings which meter a flow of inert gas in a plurality of chambers through openings for controlled partial pressure differentials in such chambers for particulate-flushing gas flow which does not interfere with the ablation beam or cause contaminant build-up.

(2) Description of Related Art

Semiconductor devices and integrated circuits are manufactured using multiple layers of different types of materials. These conductive, semi-conductive and insulation type material are deposited or formed on substrate, semiconductor die, wafer, may be used even simply on their own. The predetermined patterns for packaging electronics, biomaterials, etc are then made by removing material by etching, photolithography, photo-ablation, or other material removal techniques. During photo-ablation, the resonant energy is directly coupled into bond vibrational frequencies. This is done by quickly forcing violent vibrations between atoms so that the bonds break.

A by-product of the laser ablation process is the formation of laser "debris." The material that is ejected by the laser ablation process consists of gaseous by-products, carbon, and polymer fragments. It is shown that the macroscopic debris does not appear until more than 0.5 μs after the laser pulse is incident on the surface. Since the excimer laser pulse widths are typically less than 50 ns, the ejected debris does not interfere with the incoming light.

The functionality of the imaging is reduced by gaseous and particulate matter and the contamination of the lens elements with the out-gassed particles from the substrate will cause lens distortion and scattering of light from the lens element. Gaseous materials are relatively easier to remove using vacuum, compared with the solid debris material, which is of a greater concern if left unattended. The solids contribute to greater contamination of the surface and may also interfere with incoming light from subsequent pulses. It is therefore advantageous to remove as much as possible of the ejected debris from the ablation area before the next laser pulse begins. Vacuum alone is typically not strong enough to remove the debris from the large volume above the exposed area. A system consisting of forced gas such as nitrogen or helium combined with an exhaust is devised to minimize the effects of the debris and ensure that the exposure site is free of debris prior to the arrival of the next laser pulse.

One common practice for carrying off ablation debris involves the use of an inert gas flow across the laser ablation site. Flushing with an inert gas, or with a semi-inert gas such as nitrogen, is intended to prevent oxidizing reactions, cooling the plume and substrate, and flushing the ablated material away from the ablation site.

Without debris elimination, large carbon fragments can agglomerate or be redeposited into an area under exposure. Most redeposited fragments can be ablated by subsequent pulses. However, under certain conditions (laser fluence, particle dimensions, and mask defects) some of the fragments may be too large for the laser to remove. Under these circumstances, the carbon cluster will prevent ablation of the polymer layer beneath, which results in a carbon-encapsulated "cone" of un-ablated polymer. The task of effectively removing debris becomes even more challenging where vacuum chucks are employed to hold down the substrate material due to the peeling effect of flexible substrates. These issues pose serious reduction in throughput due to reduced efficiencies of the laser in removing material and producing cleaner vias. However, this invention discloses a vacuum debris removal system designed right around the ablation site to work optimally between pulses to effectively remove debris material to produce clean features without affecting the position of a flexible substrate coating.

BRIEF SUMMARY OF THE INVENTION

This invention provides a vacuum debris removal system which can continuously remove debris and gases from the process region. The design of the vacuum debris removal system is such that it envelopes the process region, and especially the ablation site on the currently-positioned substrate, concentrically. This allows the radiation beam to be centered in a relatively large opening about the ablation site, so the radiation beam can go through the center of the radiation site opening while the flushing gas and particulates flow about the inner periphery of the radiation site opening. This concentric configuration enables rapid debris removal between pulses and provides a debris-free region for effective material removal using a laser. The flow is directed by differential vacuum partial pressure, and conductances all the way from vacuum pump (lowest partial pressure) to the orifice around the ablation site is designed and calculated such that an optimal speed and vacuum pressure for effective removal is obtained. The throughput of the process is related to speed of traversal and by the rate of ablation or other removal process, but they in turn depend directly on the effective removal of microscopic material before they agglomerate into macro particles and hinder material removal.

An object of this invention is to enable the cost-effective fabrication of microelectronic packaging products, biomaterials, micro-fluidics, and thus to enable high throughputs.

A feature of this invention is the use of multiple chambers with metering orifices to optimize vacuum partial pressure differentials for the desired sweeping flow. However, this also enables customization for different substrates held by vacuum chucks, and deliver optimal vacuum partial pressures for effective debris removal.

Another feature of this invention is that it provides a clear path for the radiation of the ablation beam to go right through the center region of the debris removal region. This is of prime concern due to the ineffectiveness of the debris removal systems acting across the ablation site from the sides.

Another feature of the system is that it is designed to surround the ablation site and the chambers of the ablation region from all sides, making it the most effective design for debris removal.

Another feature of the invention is the provision for the movement of the debris removal system from the surface of the substrate. This is crucial in optimizing for varying substrate surface materials, particle ejection characteristics and substrate peeling from the substrate vacuum chucks (prevalent in any processing industry).

An advantage of this invention is that a virtual chamber formed by the closely-spaced current substrate and the bottom surface of the adjacent metering chamber enclose an envelope of sweeping gas around the ablation site, which keeps ablation debris from escaping to another location on the substrate, but Instead curtail ablation particulate drifting and deliver ablation particulates from the current substrate into the mouth of the ablation orifice in the adjacent metering chamber.

Other objects, features, and advantages of the invention will be apparent from the following written description, claims, abstract, and the annexed drawings.

debris collection chamber (R1) 1
debris exhaust chamber (R2) 2
sweeping gas entry chamber (R3) 3
representative atmospheric pressue metering hole 4
ablation opening 5
ablation radiation beam 6
ablation site 7
ablation opening riser tube 8
representative bypass metering hole 9
0 representative direct metering hole 10
1 exhaust outlet 11
2 housing 12
3 housing window seal 13
4 housing window 14
5 currently positioned substrate 15
6 sweeping gas inlet 16
7 representative housing chamber seal
8 representative particle 18
9 virtual sweeping gas chamber vR4 19

DETAILED DESCRIPTION OF THE INVENTION

Figure 1:
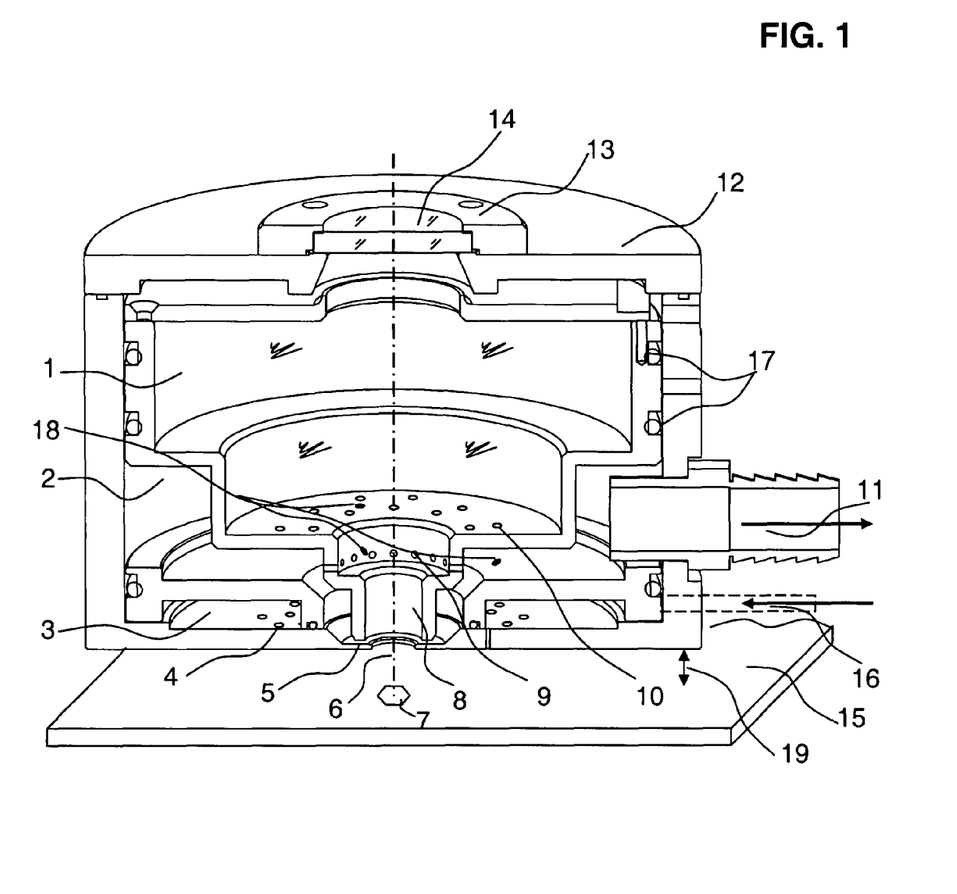
FIG. 1 is a partially-sectioned view of the vacuum debris removal subsystem, showing the sweeping gas entry chamber, debris exhaust chamber, and low partial pressure vacuum pump connection chamber, plus a virtual centripetal sweeping gas chamber formed by the current substrate and the facing bottom surface of the sweeping gas entry chamber.

FIG. 1 shows a sectional view of the vacuum debris removal subsystem in context of a photoablation system. A clear path for the ablation radiation beam, which typically is ultraviolet radiation, and may be generalized in discussion as "UV" or simply "light." This light could preferably be from an excimer laser or other type of pulsed laser source. The ablation radiation beam 6 is provided generally along the axis line, essentially the centroid of the ablation opening 8, which provides access to the ablation site 7 through all four intervening chambers.

Chamber 1, otherwise called the debris collection chamber R1, acts as the turbulence eliminating low pressure region directly in line but most remote from above the processing area, ablation site 7. Its large volume and relatively low partial pressure permit particulate debris to slow down and be carried through the only slightly larger metering holes 10 to the debris exhaust chamber R2.

Debris exhaust chamber 2 is connected to the vacuum pump (not shown) through the exhaust outlet 11 which maintains vacuum partial pressure at the lowest level in all of the debris removal subsystem. The air film above the processing region 7 of the current substrate 15, which is so closely adjacent to the bottom surface of housing 12 as to form a virtual chamber vR4 about ablation opening 5.

Chamber vR4 is identified as virtual sweeping gas chamber vR4 at reference numeral 19 in the chart. The entry path of the sweeping gas flows circumpetally, that is, radially into ablation opening 5 and away from the substrate 15 in ablation opening riser tube I8. Because the sweeping gas, now carrying particulate matter and gaseous exhaust, enters into the lower partial pressure of debris collection chamber 1, the flow follows the walls of ablation riser tube 8, leaving little interference with the ablation radiation beam 6, which follows the axis at a central position.

The sweeping gas with its gaseous and particulate products, collectively "waste," is sucked primarily into debris exhaust chamber 1, and to a lesser extent, bypasses chamber 1 and passes directly into debris exhaust chamber 2.

Sweeping gas entry chamber 3 is connected to an inert gas inlet 16 supplying inert gas at high partial pressure. The sweeping gas is typically one or a mixture of air, nitrogen and helium. Helium is preferred in our embodiment. The sweeping gas, already reduced to a relatively high partial pressure, is fed through multiple atmospheric pressure metering holes 4. The sweeping gas forms an enveloping gas virtual fence around the process region ablation site 7 over the substrate 15. The combination of inert gas, debris particles 18 and air are all removed circumferentially out through the ablation opening 5 between chamber 2 and extension of chamber 1 and through the chamber 2. This keeps the light path clear from any debris, under uniform gas density and free of turbulence.

Holes 9 and 10 are used to provide metering gas flow. This flow, in the direction of diminishing partial pressure, constantly but slowly passes from chamber 1, which is sealed away from chamber 2 by o-rings 17.

Interim Summary of Structure and Method of Operation

The nested chambers provide a balanced path between:

(First) high velocity sweeping gas flow to carry debris particles 18 from the processing area ablation site 7; and (Second) steady, uniform density and non-turbulent sweeping gas flow with particulate debris particles 18 flowing through metering holes 9-10, which are only slightly larger than the larger expected debris particles 18.

This method ensures high conductance, and provides the most effective debris 18 removal without contaminating the surrounding optics. Clear optical window 14 is provided on top of the chamber 1 housing 12 and held in place by a housing window seal 13, which in turn seals the chamber 1 away from atmospheric pressure.

Scientific Discussion

Figure 2:
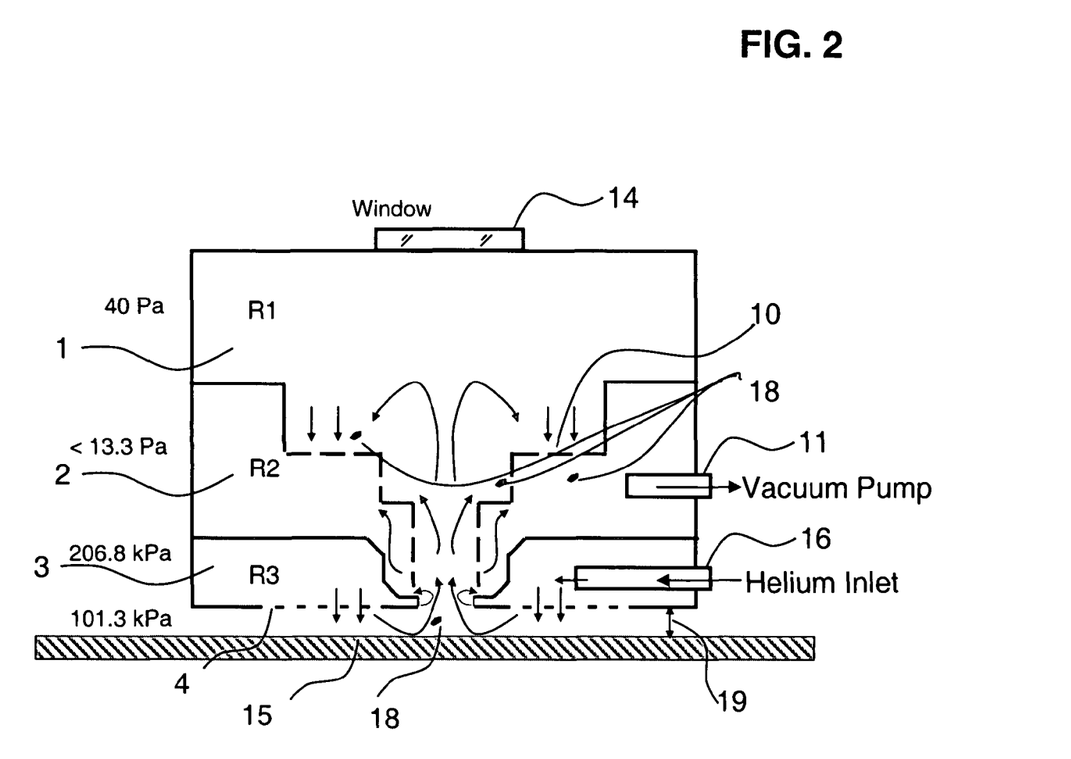
FIG. 2 shows the operation of the vacuum debris removal system, showing the three sweeping gas metering chambers R1, R2 and R3 and the virtual centripetal sweeping gas chamber vR4. The debris exhaust chamber R2 is connected to the vacuum pump and a sweeping inert gas inlet is connected to the sweeping gas entry chamber R3. In this case, the sweeping gas is shown as Helium.

FIG. 2 shows a schematic of the vacuum debris removal subsystem of FIG. 1. FIG. 2 will be helpful for conductance computation, which will follow in the written description text and in the following figures. The flow pattern is clearly illustrated where an envelope of gases from sweeping gas entry chamber 3 would hit the surface of substrate 15 and surround the processing region ablation site 7. The sweeping gas flows through ablation opening 5 and in small measure through bypass metering holes 9 into debris exhaust chamber 2, and primarily through region above ablation opening 8 into debris collection chamber 1. The sweeping gas loses turbulence and any passenger particulate debris settles down in the large debris collection chamber 1. The sweeping gas and passenger particles 18 continue into the debris exhaust chamber 2, through direct metering holes 9 and 10. Desired partial pressures are listed as well as the vacuum pump connection 11 and sweeping gas inlet connection 16.

The chambers 1, 2 and 3 will also be referred to as R1, R2 and R3 respectively for ease of understanding, especially with respect to formulations.

Conductance of vacuum line leading to the vacuum debris removal system shown in FIGS. 1 and 2 is based on achieving low pressure. In order to achieve low pressure in a vacuum line, gases must be removed by pumping each molecule out; as it is removed it must flow from one end of the tube to the other. The rate of flow of a gas, called the throughput Q, is defined as $$Q = P\frac{dV}{dt}$$

where P is the pressure at which it is measured, and dV/dt is the volume flow rate. Notice that throughput does not have the same units as ordinary gas flow rate (unit volume/unit time). The units of throughput are pressure×volume/time or energy/time, that is, L atm min$^{-1}$ (sometimes Torr L/sec or in SI units, Pa m$^3$ s$^{-1}$, or J s$^{-1}$, or watts). The throughput depends directly on the resistance to flow and the pressure drop between the entrance and exit to a tube or channel:

$$Q = \frac{P_2 - P_1}{Z} = C(P_2 - P_1)$$

where $P_1$ is the downstream pressure (measured at the exit). $P_2$ is the upstream pressure (measured at the entrance), Z=1/C is the resistance and C is the conductance. The conductance is the throughput per unit pressure difference between the tube entrance and exit. The units of conductance are the same that of volume rate or pumping speed, so conductance can be expressed in L/min, L/sec, m$^3$/hour, etc. Therefore, the cumulative conductance is calculated as $$\frac{1}{C_T} = \frac{1}{C_1} + \frac{1}{C_2} + \frac{1}{C_3} + \ldots$$

The nature of gas flow through a tube is quite different at low pressures than at high pressures. In addition, the flow characteristics depend on the flow rate and the geometry of the tube, pipe, chamber or channel through which the gas flows. Three kinds of flow are recognized: turbulent, viscous (laminar), and molecular. The rough ranges of flow for each are summarized in the table.

TABLE 1

Summarizes the types of gas flow and their range

| Flow Type Pressure | Reynolds No. | Knudsen No. |
|---|---|---|
| Turbulent High | >2200 | — |
| Viscous Medium | <1200 | <0.01 |
| Molecular Low | — | >1.00 |

As a result, at any pressure in Molecular Flow, the conductances of tubes, valves, traps, and other passive components is constant and at their lowest value. In Transition Flow, the conductance increases non-linearly as the pressure increase. In Continuum Flow (viscous flow) the conductances increases linearly (and sharply) with pressure. At atmospheric pressure, a particular component's conductance may be 10$^4$ times higher than its Molecular Flow value In the region of viscous flow about 10$^{-3}$ Torr, gas properties depend upon collisions between molecules, which occur much more frequently than between molecules and their container. For viscous flow, the Poiseuille equation gives the throughput through a straight tube of circular cross section.

$$Q = \frac{\pi d^4}{128\eta l}P_{ave}(P_2 - P_1)$$

Where d and l are the tube diameter and length, η is the gas viscosity, and $P_{ave}$ is the average of $P_2$ and $P_1$. If we combine equations, we obtain an equation for the viscous flow conductance in a tube of circular cross section:

$$C = \frac{\pi d^4}{128\eta l}P_{ave}$$

Note that unit of viscosity is the CGS unit, the poise: 1 poise=1 g cm$^{-1}$ sec$^{-1}$. The SI unit is the Pa s: 1 Pa s=1 kg m$^{-1}$ s$^{-1}$. Thus 1 poise=0.1 Pa s. The viscosity of air at 25° C. is 1.845×10$^{-4}$ poise=1.845×10$^{-5}$ Pa s. If d and l are given in centimeters and $P_{ave}$ in torr, then conductance of tube, C in L/sec for air at 25° C. is:

$$C = 182\frac{d^4}{l}P_{ave}$$

Figure 3:
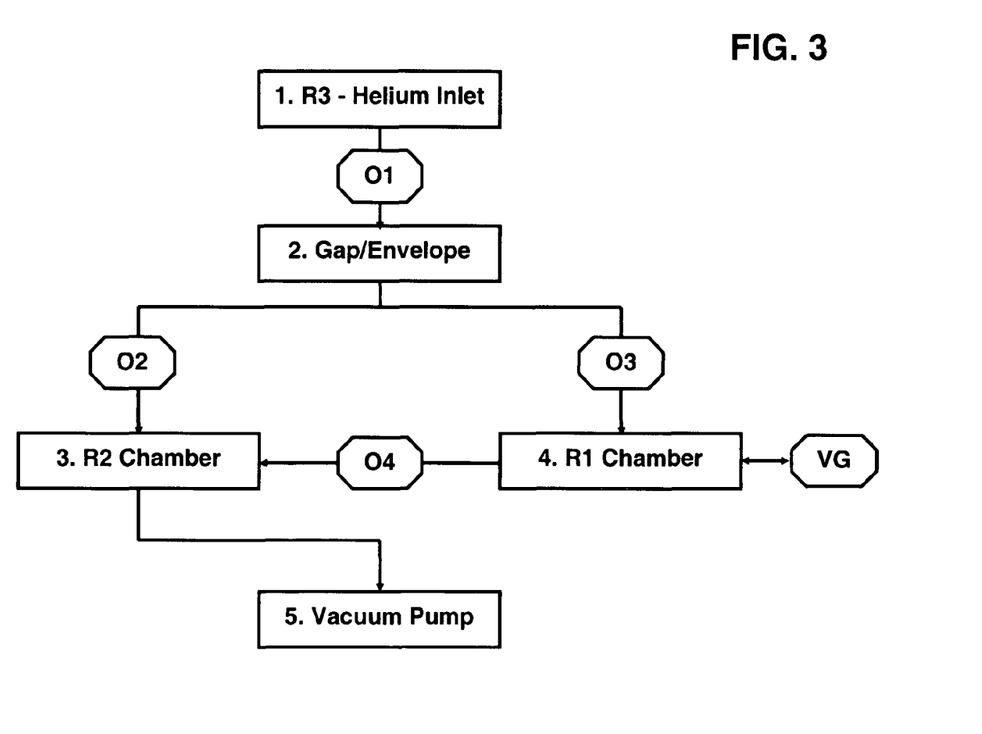
FIG. 3 shows logically the connections between the three metering chambers of the debris removal subsystem and the flow pattern, in which O1, O2, O3 and O4 represent the composite effect of orifices connecting R3, R2, and R1, and between R1 and R2 respectively.

FIG. 3 shows logically the connections between the three chambers of debris removal system for conductance computation in the following sections. Flow schematic for the debris removal system between the chambers and the substrate is shown, which will be used to compute effective conductance of the system. Here Inert gas from 3 flows through orifice O1 and forms an envelope around the process region 7 and flows both through orifices O2 and O3 into region 2 and 3 respectively. Which in turn is connected to each other though orifice O4. The vacuum pump 11 exhausts debris and gas mixture from the region 2. The concept of choked flow between these orifices is explained below. The conductance computation example along with the formulations will be further employed to describe the invention.

Critical Pressure—Choke Flow $$\frac{P_1}{P_2} = \left(\frac{\gamma+1}{2}\right)^{\left(\frac{\gamma}{\gamma-1}\right)}, \gamma_{air} = 1.4,$$

$\gamma_{He} = 1.63$

= 1.829 □□□□□□□ air

= 2.03093 He

= 0.528 air

= 0.4928 He

Critical ratio Pressure ≈ 0.5 (mixture)

Figure 4:
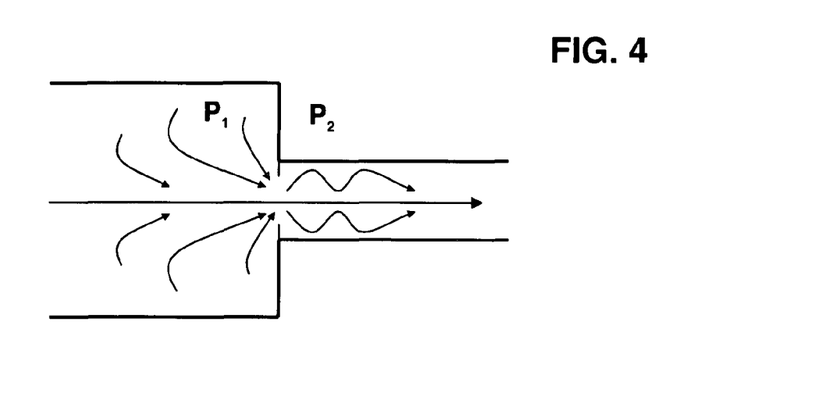
FIG. 4 shows flow through orifice between chambers maintained at diminishing partial pressures P1 and P2.

FIG. 4 shows orifices and flow through two sections maintained at pressures P1 and P2. For an orifice area A in cm² and for viscous flow the following equations (after Prandtl) apply to air at 25° C. where $\delta = p_2/p_1$.

$$C = 76.6\delta^{0.712}\sqrt{1-\delta^{0.288}}\frac{A}{1-\delta}\frac{\ell}{s} \quad \text{for } \delta \geq \delta_{cr}$$

$$C = 20\frac{A}{1-\delta}\frac{\ell}{s} \quad \text{for } \delta \leq \delta_{cr}$$

$$C = 20A\frac{\ell}{s} \quad \text{for } \delta \geq 0.03$$

$\delta_{cr} = (p_2/p_1)_{cr} = 0.528$ (Critical pressure for air)

Flow is choked at $\delta \leq 0.528$ gas flow is thus constant.

Figure 5:
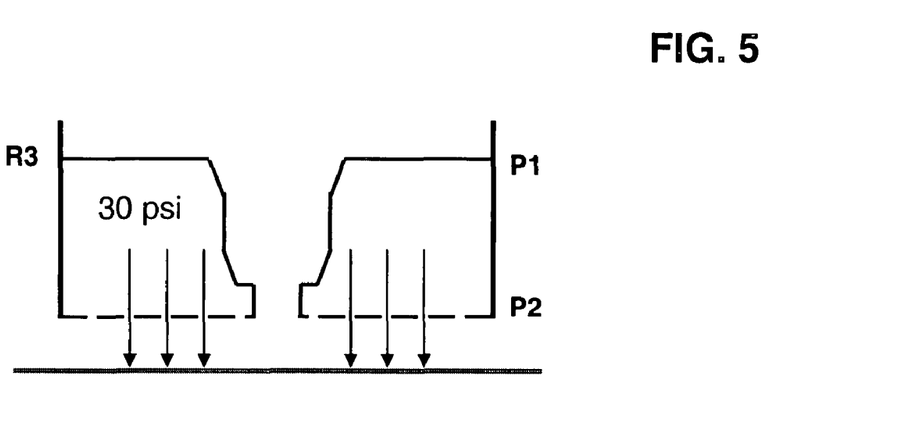
FIG. 5 shows a schematic of pressure differential of the chamber R3 expunging inert gas. In this case Helium.

FIG. 5 shows high pressure inert gas from 16 expunged out on to the substrate through orifices 4. Flow through region 3 towards 7 is maintained at pressures P1 and P2.

Atmospheric pressure=14.69 psi $$\frac{P_2}{P_1} = \left(\frac{14.69}{30}\right) = 0.4903 < 0.5 \text{ Choked flow}$$

Using conductance formulation of the orifice $$C = 20\frac{A}{1-\delta}\frac{\ell}{s} \quad \text{for } \delta < \delta_{cr}$$

$$= 39.24 A\frac{\ell}{s}$$

$$= 39.24\pi\frac{(0.07874)^2}{4}$$

$$= 0.1910\frac{\ell}{s}$$

Cumulative conductance of 45 orifices from chamber R3 to substrate, all in parallel to each other.

C=45 (no. of orifices)*0.1910=8.6 l/s

Figure 6:
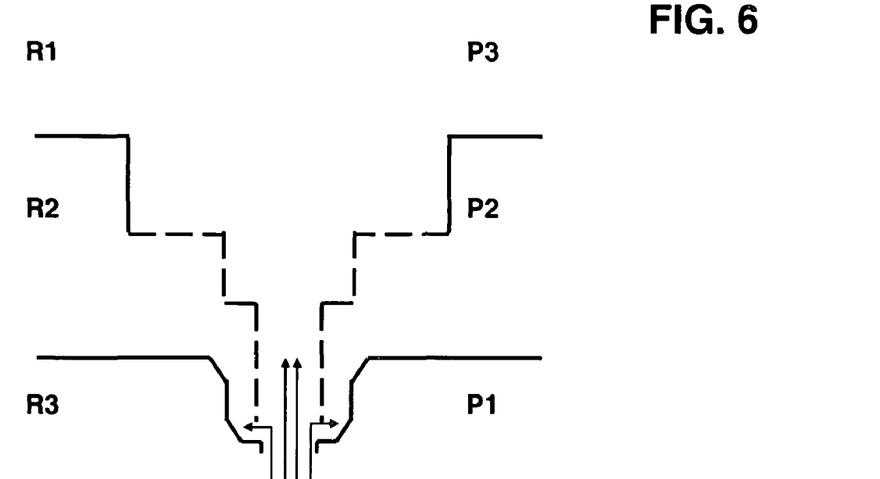
FIG. 6 illustrates the flow of inert sweeping gas from R3, debris and gases into chambers R1 and R2.

FIG. 6 shows flow through two chambers from the surface of the substrate. Chambers R3, R2 and R1 are maintained at pressures P1, P2 and P3 respectively. The effect of low pressure gas in 1, the chamber R1 is understood by considering two cases, a) Gas at 300 torr and b) Gas at atmospheric pressure. The range of Case (a)

Considering 30 psi=155*10⁴ mTorr envelope pressure $$\frac{P_3}{P_1} = \left(\frac{76*10^4}{155*10^4}\right) = 0.4903 << 0.5 \text{ Choked Flow} \quad (i)$$

$$\frac{P_2}{P_1} = \left(\frac{100}{155*10^4}\right) = 0.0000645 << 0.5 \text{ Choked Flow} \quad (ii)$$

Case (b)

Considering 14.5 psi=76*104 mTorr atmospheric pressure $$\frac{P_3}{P_1} = \left(\frac{300}{76*10^4}\right) = 3.947*10^{-4} << 0.5 \text{ Choked Flow} \quad (i)$$

$$\frac{P_2}{P_1} = \left(\frac{100}{76*10^4}\right) = 1.315*10^{-4} << 0.5 \text{ Choked Flow} \quad (ii)$$

From conductance through orifices discussed above $$C = 20\frac{A}{1-\delta}\frac{\ell}{s} \quad \text{for } \delta < \delta_{cr}$$

Case (a)

=39.2387*$A_2$=52.08 l/s [$A_2$=□(1.3)²/4=1.3273]  (i)

=20.00129*$A_3$=11.86 l/s  (ii)

Case (b)

=20.00789*$A_2$=26.55 l/s [$A_3$=2□(1.3)/2*0.1452=0.593]  (i)

=20.00263*$A_3$=11.86 l/s  (ii)

case (a) or (b) envelope pressure or no pressure

C=52.08 l/s into chamber $R_1$  (i)

C=11.86 l/s into chamber $R_2$  (ii)

Figure 7:
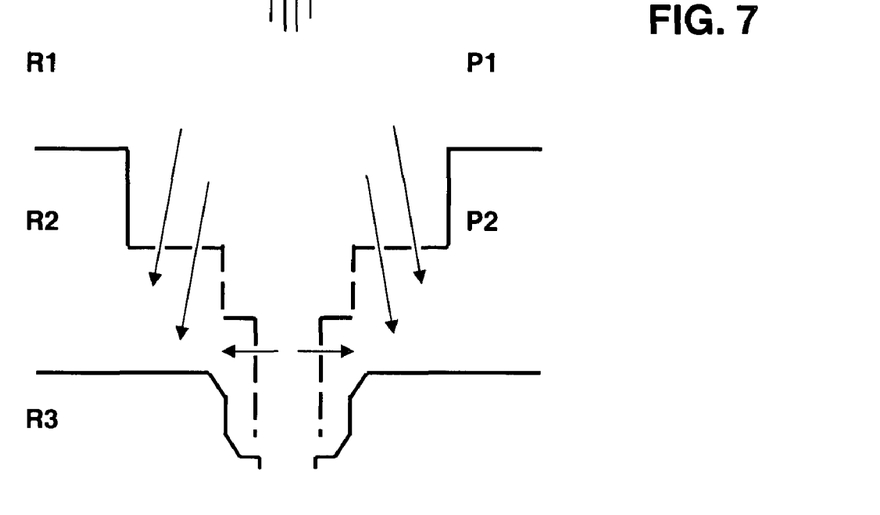
FIG. 7 illustrates the flow of the mixture of sweeping gases and particulates settled into chambers R1 and thence into R2, and to some extent passing into R2 directly, exhaust chamber R2 being connected to the vacuum pump which maintains lowest partial pressure. Individual items and representative individual items in groups of such items, are shown in the following table.

FIG. 7 shows the flow from the inside of the region 1 from the side orifices 9 and top orifices 10 into the region 2. The chambers R1 and R2 are maintained at pressures P1 and P2 repectively.

Orifice from chamber R1 to R2

$$\frac{P_2}{P_1} = \left(\frac{100}{76*10^4}\right) = 0.33 < 0.5 \text{ Choked Flow}$$

$$C = 20A\frac{\ell}{s} \quad \text{for } \delta < 0.03$$

$$= 20A\frac{\ell}{s}$$

$$= 20\pi\frac{(0.15875)^2}{4}$$

$$= 0.3958\frac{\ell}{s}$$

Cumulative conductance of 48 orifices from region R1 to R2, all in parallel to each other.

C=48 (no. of orifices)*0.3958=19 l/s

The overall conductance of the system is computed with the required conductance from the module connected to vacuum pump is represented as $C_{VP}$ which incorporates pumping speed and conductances of valves, filters etc. The boxes 1 to 8 of the schematic diagram shown in figure represent module independent of the DRS model design.

$$C_{VP} = C \text{ (from } Sbst \to R_1 \to R_2) + C \text{ (from } Sbst \to R_2)$$

$$C(\text{from } Sbst \to R_1 \to R_2) = 1 / \left[ \frac{1}{C_{S \to R_1}} + \frac{1}{C_{R_1 \to R_2}} \right]$$

$$= 1 / \left[ \frac{1}{26.55} + \frac{1}{19} \right]$$

$$= 1 / \left[ \frac{1}{19} \right]$$

Case $a$: $C(\text{from } Sbst \to R_1 \to R_2) = 11.07 \frac{\ell}{s}$

Case $b$: $C(\text{from } Sbst \to R_1 \to R_2) = 13.91 \frac{\ell}{s}$ $C(\text{from } Sbst \to R_2) = 11.86 \frac{\ell}{s}$ Case a: $C_{VP}$=22.93 l/s and case b: $C_{VP}$=25 l/s In fact, reducing the requirement for higher flow rate from the vacuum pump and in turn providing a range of velocities for effective debris removal.

DRS Gap

DRS gap and control of velocity, in turn controlling force required in picking up of debris is equally important in comparison with maintaining of desired conductance.

Throughput $Q = C^* \Box P$ $= C^* F/A$ since, difference in pressure=Force per unit area $F = (Q^* A)/C$ =throughput*area/conductance $F \propto Q$ $F \propto 1/C$ $F \propto A$ but $Q \propto C$ $C \propto d^4/l$ $A \propto d^2$ It can be said for a constant throughput maintained in the lines and DRS $F \propto l/d^2$ This is clearly against the requirement for maintaining better conductance. This means that with higher particle ejection rate the increase in particle size makes the conductance and velocity inversely proportional to each other. Thus this unique chamber design accommodates varying velocities and conductance thus delivering a steady state. Optimization over these interdependent chambers for maximizing velocity and conductance and customization depending upon the process, debris size and rate of removal can be done While the invention has been shown preferably through the embodiments illustrated in the FIGS. 1-7, it will be clear to those skilled in the art that the modifications described as alternatives, and other alternatives, may be pursued without departing from the spirit and the scope of the invention, as defined in the following claims.

What is claimed is:

1. In a high-resolution, high-speed three dimensional radiation ablation system having an ablation station equipped with means to position a current substrate for processing, means to provide actinic radiation for treating such current substrate at an ablation site, whereby controlled radiation ablation by a sequence of pulses may be inhibited by dynamically produced ablation debris, such ablation station is equipped with a high-speed vacuum debris removal system (DRS) for effective and efficient engulfing and removal of such dynamically produced debris of various sizes, between each pulse of controlled radiation ablation process, characterized by:
   an improved DRS having a multiplicity of essentially sealed coaxial chambers from a first chamber having an actinic beam admission means (14), and each subsequent chamber similarly having beam admission means, as a composite leading to such ablation site (7) where ablation may take place with the possibility of producing inhibiting particulate debris, such chambers including a plurality of chambers (1, 2 ... n), the chamber having the ablation site being equipped with means (16) for controlled flow of sweeping gas providing turbulence and flow sufficient to sweep ablation-inhibiting particles (18) at a velocity sufficient to propel such an inhibiting particle (18) selectively into one of said first chamber an intervening chamber, and with diminishing velocity and turbulence to continue sweeping gas flow propelling such ablation-inhibiting particles further from said first chamber and said intervening chamber into an exhaust chamber for disposal, further characterized by:
   metering holes interconnecting adjacent chambers for controlling partial pressures to carry particulate debris (18) along paths of diminishing vacuum partial pressures and turbulence.

2. A debris removal subsystem according to claim 1, further characterized by:
   means to provide sweeping gas flow interspersed with laser pulses for minimization of interference.

3. A radiation ablation system with a debris removal subsystem according to claim 1, further characterized by:
   metering holes interconnecting adjacent chambers for controlling partial pressures to carry particulate debris (18) along both a direct path of diminishing vacuum partial pressures and turbulence and a bypass path.

4. A radiation ablation system with a debris removal subsystem according to claim 1, further characterized by:
   metering holes interconnecting adjacent chambers, such metering holes being in such numbers and having such volumetric characteristics as to control partial pressures to carry particulate debris (18) along at least one path of diminishing vacuum partial pressures and turbulence, at least some of such metering holes being capable of passing an inhibiting particle produceable by ablation.

5. A method for debris removal in photoablation, for carrying away products, including particulate debris which inhibit photoablation, according to the following steps:
   (a) Providing a series of nested gasflow-interconnected chambers in an enclosure generally sealed for vacuum partial pressure differentials between adjacent chambers and permitting passage of photoablation light through all nested chambers, the most distant of such chambers from the photoablation light source being closed by a current substrate for ablation by an actinic light beam, thus providing a final virtual chamber;

(b) Providing metering holes interconnecting such adjacent chambers, such metering holes having composite characteristics permitting passage of particulate debris while metering sweeping gas flow for diminishing turbulence and diminishing partial pressure from entry of sweeping gas to exit of sweeping gas carrying ablation-inhibiting particulate debris; and (c) Providing sweeping gas into an intermediate chamber adjacent to such final virtual chamber, so as to provide circumpetal entry of sweeping gas and particulate debris from the ablation site and into the chamber most distant from the ablation site, such chamber being of expansive volume to serve as a debris collection chamber with diminished turbulence of sweeping gas; and (d) Providing a sweeping gas partial pressure by such metering holes, at least some of which are large enough to pass particulate debris, into an intermediate chamber which serves as a debris exhaust chamber.

6. A method for debris removal in photoablation, for carrying away products, including particulate debris which inhibit photoablation, according to the following steps:

(a) Providing a series of nested gasflow-interconnected chambers in an enclosure generally sealed for vacuum partial pressure differentials between adjacent chambers and permitting passage of photoablation light from an ablation riser tube through all nested chambers, the most distant of such chambers from the photoablation light source being closed by a current substrate for ablation by an actinic light beam, thus providing a final virtual chamber at substantially atmospheric pressure;

(b) Providing metering holes interconnecting metering gas into such final virtual chamber from an adjacent chamber having an inlet for flowing metering gas at a pressure substantially higher than atmospheric pressure, such metering holes having composite characteristics providing sweeping gas flow at substantially atmospheric pressure flowing circumpedially into an ablation opening and into said ablation riser tube with minimal lateral flow to carry particulate ablation products gently along a set of paths for diminishing turbulence and diminishing partial pressure from entry of sweeping gas to exit of sweeping gas carrying such ablation-inhibiting particulate debris; and (c) Providing a sweeping gas partial pressure by metering holes positioned beyond said ablation riser tube, at least some of which are large enough to pass particulate debris toward a debris exhaust.

* * * * *